Jan. 9, 1934.   C. J. CRAWFORD   1,943,111
SLIDING CLASP FASTENING
Filed March 28, 1930   2 Sheets-Sheet 1
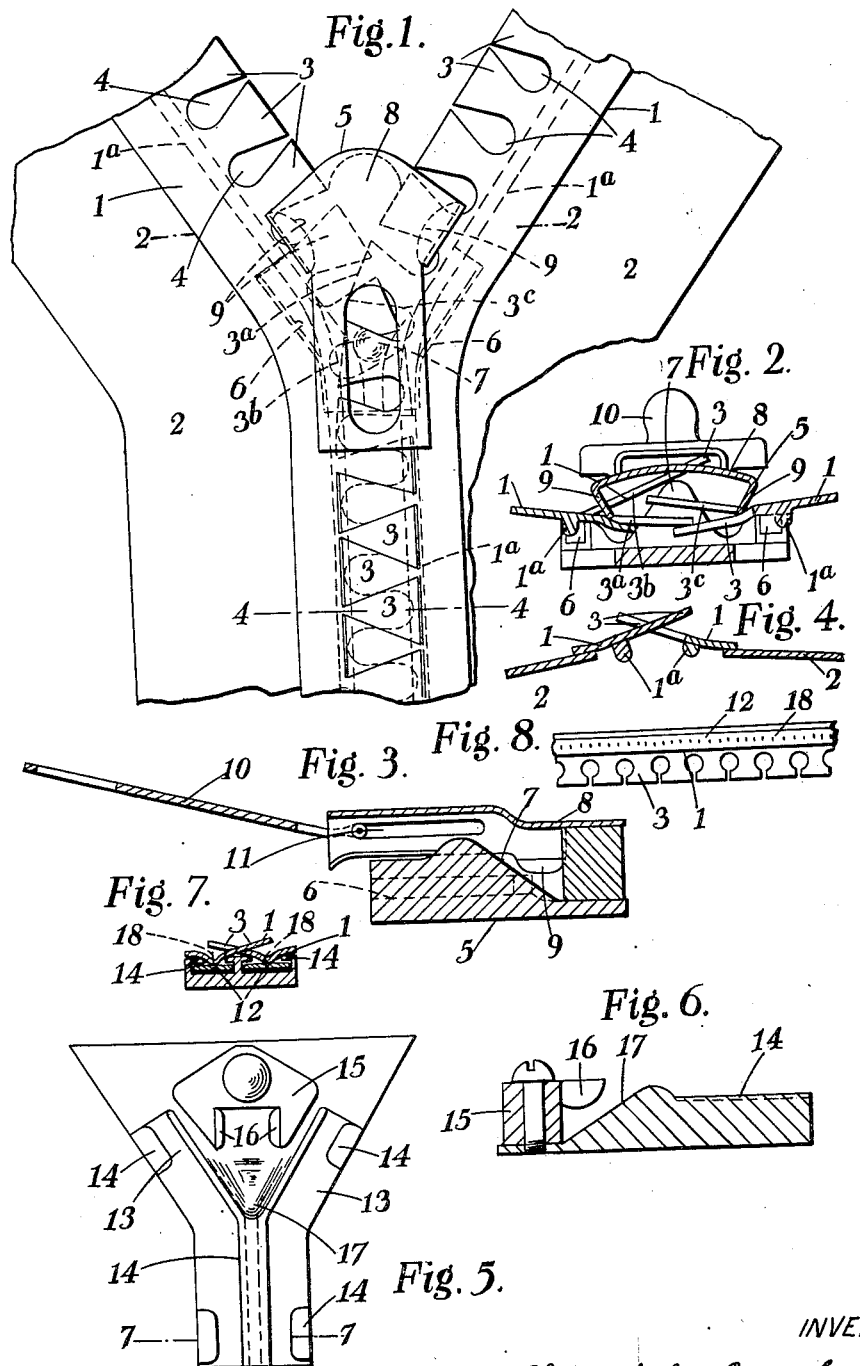
INVENTOR
Charles John Crawford
BY
Nathan & Bowman
ATTORNEYS Jan. 9, 1934.    C. J. CRAWFORD    1,943,111
SLIDING CLASP FASTENING
Filed March 28, 1930    2 Sheets-Sheet 2
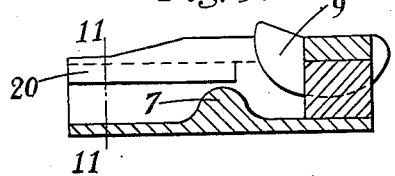
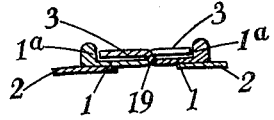
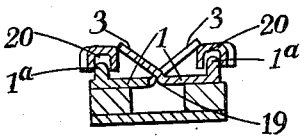
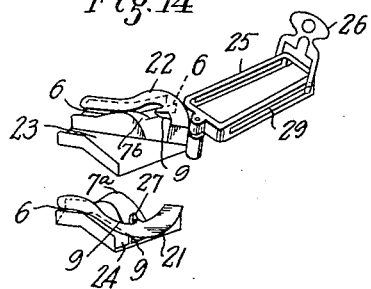
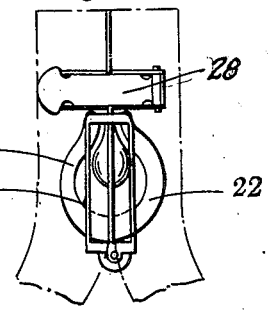
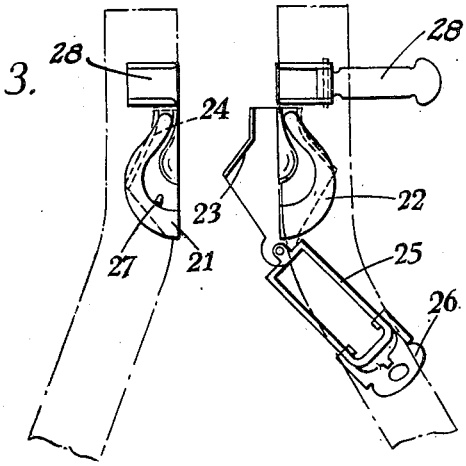
INVENTOR
Charles John Crawford
BY
Nathan & Bowman
ATTORNEYS Patented Jan. 9, 1934

1,943,111

UNITED STATES PATENT OFFICE 1,943,111

SLIDING CLASP FASTENING

Charles John Crawford, London, England, assignor of one-half to Thomas Bateman Powell, Surrey, England Application March 28, 1930, Serial No. 439,619, and in Great Britain April 8, 1929

27 Claims. (Cl. 24—205)

The present invention relates to improvements in or relating to sliding clasp fastenings, i. e. to that type of fastening in which fastening pieces on two strips are joined together or separated by a slider.

It is an object of the present invention to simplify the sliding clasp fastenings of the kind above referred to, and in doing this to improve the appearance of the fastenings while retaining the security thereof.

Another object of the present invention is to enable the locking members and the various components to be formed in a manner which shall conduce to favourable manufacturing economies.

Hitherto such clasp fastenings have been of two classes. In the one class the fastening devices have been engaged by successive rotations in or parallel to the plane which passes through the cords or the like let into the edges of the materials to be joined. In the other class snap devices, i. e., press buttons were provided on the edges which snap devices were forced together to effect the junction.

According to the main feature of the present invention, however, the connection is effected by successive rotations of the fastening devices about axes parallel to the line of junction of the two strips—and usually the rotations are first in one direction and then in the reverse direction to cause the fastening pieces on each strip to penetrate the intervening spaces on the other strip. Where the strips are converged or diverged in closing or opening there will also be a certain amount of rotation about an axis at right angles to the line of junction.

According to another feature of the invention the fastening devices when joined lie in two interpenetrating planes, though if desired they can be so designed as to lie in one plane.

By reason of this rotation about axes parallel to the line of junction it will be seen that by this invention interpenetrating pieces may be engaged which have narrow necks and broad heads the spaces between the successive heads of the pieces on one strip being less than the breadth of the heads on the opposing piece, though equal to or greater than that of the necks.

This renders possible what is another feature of the invention, viz., that the engaging pieces may be formed of soft and flexible material, e. g. soft leather or rubber, and these are conveniently formed from the material of the strips themselves, though other material, flexible or not, may be employed. In one convenient form of manufacture the two strips with their engaging pieces can be cut or stamped from a single piece of leather or the like.

In the preferred form of my invention the interlocking pieces are staggered.

The shape of the projections may vary, that like or similar to a straight or curved dove tail or trapezium serving well, but a T or other shape giving a similarly functioning wider tip or head may be adopted.

Conveniently and advantageously the intervening spaces or indentures substantially or fairly correspond in width at the bottoms thereof with the width of the narrowed base or part of the projections, but at or towards the mouths thereof such spaces or indentures narrow to a width less than said narrow parts of the projections. It will be obvious that the tips or heads of the projections are thus wider than any parts of the intervening spaces.

Edges so formed to interpenetrate and interengage may be caused to do so by successively entering a projection of one strip edgewise and obliquely between adjoining projections of the other strip while one of the adjoining projections is raised or bent up and the other is lowered or bent down, the relation of the entering projection and the bottom of the corresponding or receiving indenture being such during the engagement movement that the projection in question clears and preferably overlaps the bottom of such indenture.

A reverse operation serves to separate the strips.

Certain forms of the invention may have the penetrable edges of the strips stepped away therefrom to conduce to a flat lie of the interpenetrated interlocked edges.

The strip component may be formed from leather, fabric, rubber, or other suitable material or materials.

Another feature of my invention lies in an improved slider for the purpose of conveniently effecting the necessary rotations, and in particular for first rotating the interlocking pieces in one direction and then in the other and thereby drawing together or separating the interpenetrating interlocking edges of the fastening.

As many embodiments of the present invention may be made it is to be understood that the accompanying drawings show constructional examples only and are not to be interpreted in a limiting sense.

In the drawings,

Fig. 1 is a plan view. Fig. 2 a sectional view on the line 2—2 of Fig. 1, Fig. 3 is a sectional view of the sliding cam device, and Fig. 4 a cross sectional view on the line 4—4 of Fig. 1. Figs. 5 and 6 are plan and sectional views respectively of a modified form of sliding cam device. Fig. 7 a sectional view on the line 7—7 of Fig. 5 showing the strips in position therein. Fig. 8 is a modified form of strip. Fig. 9 is a sectional view of a further modified form of slider for use with stepped forms of interlocking strips as shown by Fig. 10, and Fig. 11 is a sectional view on the line 11—11 of Fig. 9 with the strip in position in the cam device. Figs. 12 and 13 are plan views of a separable sliding cam device hereinafter referred to, and Fig. 14 is a perspective view thereof.

Referring to Figs. 1 to 4 of the accompanying drawings the edge of strips 1 attached to stringers 2 have edgewise interlocking teeth or projections 3 arranged continuously and in staggered relation the one row to the other, the teeth making locking engagement by mutual overhang. In this example the teeth are provided by notching, slitting or indenting the edges of the thin strips. The teeth are wider at the tips or heads than the mouths of the intervening notches 4.

The operation of fastening and separating the strips is performed by a sliding cam device 5 in which in the convenient constructional form shown by Figs. 1 to 3 has a V, or curved V or Y or like or similar shaped channels 6 through which ribs 1a of the strips pass and by which on sliding the cam device 5 along the strips these are converged and drawn together or separated.

In cross section the slider has a guiding channel 6 at each side of a medial arch piece or cam member 7 serving as directing means so as to relate or present the converging rows of projections obliquely to each other.

The front of the sliding cam device has a bridge 8 at the wider end, and below the bridge are feelers or directing members 9 by which the projections over which they ride are released at the proper time for being properly directed into their corresponding indentures by the directing means of the cam device.

The sliding cam device is actuated by a grip-piece 10 working in a slide-guide 11 forming part of the slider.

Fig. 2 shows how the teeth of one strip are first deflected downwardly from a central or neutral position by the feelers 9 and then ride up the arch piece or cam 7 to a position above said neutral position, so that a tooth on the other strip is directed between a co-operating pair on the first strip. It will be seen that the teeth 3a and 3b of the first strip are respectively deflected downwardly by the feeler and forced upwardly by the cam 7 so that a tooth 3c of the other strip can enter between the said teeth 3a and 3b.

Figs. 5, 6 and 7 show a modified form of slider and strip therefor.

In this example the strips 1 with interpenetrating and interengaging edges may be backed with strips 12 forming a runway or runways for the slider, the interlocking strips receiving that support or reinforcement from the runway strips which tends to relieve the interlocking edges from undesirable stress when the interlocking strips are brought together or separated by the slider.

For engaging the runway strips it is convenient to provide the slider with separate converging grooves 13, with side walls having inturned overhanging tops 14.

The front of the sliding cam device is medially open except for a bridge 15 at the wider end, and below the bridge are feelers or directing members 16 by which the projections over which they ride are released at the proper time for being properly directed into the corresponding indentures by the directing means of the cam device 17.

The grooves may be continuous as shown in Figs. 1 to 3 or discontinuous grooves as shown in Figs. 5, 6 and 7, the latter tending to avoid undue binding of the runways therein, and to make for easier sliding movement of the slider.

The runway strips may be conveniently and advantageously sewn to the interlocking strips by a medial row or rows of stitches 18 whereby to permit the inturned edges of the grooves to engage behind the runways.

Fig. 8 shows a strip with T-shaped teeth.

Figs. 9, 10 and 11 show a form having the penetratable edges of the strips stepped up at 19 to conduce to a flat lie of the interlocked edges.

This construction also shows runway forming ribs or beads 1a on the interlocking side of the strips so as to give a more compact form of strip, thereby forming a species of recess along the strips in which the interlocking pieces lie. These runway ribs or beads 1a may be formed integral with the strips.

The stringer may be attached to the strip as by sewing between the rib and the bottom of the teeth.

The sliding cam device for co-operating with the strips in this example has inverted channels 20 to accommodate the ribs or beads 1a.

Fig. 11 shows two teeth of the strip in the sliding cam device and Fig. 10 shows the flat lie of the edges after being interlocked and free of the cam device.

The sliding cam device may be formed of separable members each adapted to be attached to its corresponding strip in any suitable manner.

As shown in Figs. 12 and 13 the cam device is made up of two components 21 and 22, the component 22 having a channel 23 in which the base part 24 of the component 21 fits. The component 22 has a pivoted member 25 having a guideway 29 in which the actuating knob 26 works, to enable the knob to be slid from one end to the other of the pivoted member for pulling the slider in reverse directions.

The member 25 is limited in movement in one direction by a stop 27 on the component 21 and when in the position shown in Fig. 12 the member 25 prevents the two components 21 and 22 from being separated. The ends of the fastening strips may be held together by a separable buckle fastening 28 of which one component is on one strip and the other component is on the other strip.

When the fastening is to be separated the buckle fastening is undone and the pivoted member swung round to the position shown in Fig. 13.

The separable slider is provided with guide channels 6 one on each component, for guiding the strips into or out of interlocking engagement. The cam 7 by which the fastening pieces are rotated in one direction is formed in two parts, one part 7a being on the component 21 and the other part 7b being on the component 22. Each component has a cam or directing member 9 for rotating the pieces in the opposite direction to that in which they are rotated by cam 7.

The locking strips may be sewn to bands or tapes of fabric, etc., for attachment to the garments and other articles, the slider being formed so as to permit the passages of such bands or tapes.

In certain cases, fastening strips under the present invention, e. g., such as those formed by stamping out of leather, rubber or the like may have the projections tipped with metallic or other comparatively rigid edgings or margins.

The stitching by which the components of the compound strip hereinabove described are united may also serve to connect the compound strip to a band or tape for attachment in turn to a garment or other article.

As previously stated the teeth or projections may be formed or provided on the strips by any suitable means. For example the teeth or projections may be formed on the strips by any suitable moulding or cutting method, or by a stamping or punching method such as that known as pinking.

What I claim is:—

1. A sliding clasp fastening of the kind described comprising strips having interpenetrating interlocking fastening pieces the fastening pieces on each strip being spaced from each other and formed with relatively narrow neck portions supporting considerably wider head portions; and a slider movable along said strips for joining together or separating said strips, said pieces being shaped and arranged so as to interlock positively by interdigitated relationship, and said slider having means for causing such pieces to be successively rotated about axes parallel to the line of junction of the strips for the purpose of positively interlocking such pieces.

2. A sliding clasp fastening of the kind described comprising strips having interpenetrating interlocking fastening pieces and a slider for joining together or separating said strips, said slider having means for causing such pieces to be successively rotated first to one side and then to the other of a neutral position about axes parallel to the line of junction of the strips for the purpose of effecting the engagement of such pieces.

3. A sliding clasp fastening of the kind described comprising strips having interpenetrating interlocking fastening pieces and a slider for joining together or separating said strips, said slider having means for causing such pieces to be successively rotated first to one side and then to the other of a neutral position about axes parallel to the line of junction of the strips for the purpose of effecting the engagement of such pieces, the said pieces being capable of interlocking without relative movement of the engaging parts parallel to such line.

4. A sliding clasp fastening of the kind described comprising interpenetrating interlocking strips having fastening projections formed along the edges thereof and a slider for joining together or separating said strips, said strips and said fastening pieces being formed of flexible material providing flexing hinges for said pieces to permit said pieces to be rotated about axes parallel to the line of junction of the strips, and said slider having means so to rotate said pieces to cause the strips to interpenetrate and interlock.

5. A sliding clasp fastening of the kind described comprising interlocking strips of flexible material formed with interlocking elements spaced along the longitudinal edges of said strips, said elements having narrow neck portions and widened head portions; and a slider for joining together or separating said strips, said slider having means to cause such interlocking elements to be successively rotated about axes parallel to the line of junction of the strips to permit said elements to penetrate said spaces and thereby interlock said strips.

6. A sliding clasp fastening of the kind described comprising interlocking strips, a slider for joining together or separating said strips, said strips having fastening projections and spaces between said projections, said projections having their heads considerably wider than any part of the intervening spaces, and said slider having means to rotate said projections about axes parallel to the line of junction of the strips to cause said projections to penetrate said spaces and interlock the said strips with each other.

7. A sliding clasp fastening of the kind described comprising interlocking strips of flexible material having fastening pieces along the fastening edges thereof and a slider for joining together or separating said fastening pieces, said slider having means to rotate said pieces about axes parallel to the line of junction of the strips to cause the fastening pieces to interpenetrate and interlock with each other, said edges being stepped away from the main portion of the strips so as when locked to lie substantially flat.

8. A sliding clasp fastening of the kind described comprising interlocking strips of flexible material having fastening pieces and a slider for joining together or separating said strips by locking or unlocking said fastening pieces, said slider having means to rotate said pieces about axes parallel to the line of junction of the strips to cause the strips to lock together by an intersection of their edges, said strips having runways for the slider therealong behind the fastening pieces, said runways being on the same side of the strips as the intersected edges.

9. A sliding clasp fastener of the kind described comprising interlocking strips of flexible material having fastening pieces and a slider for joining together or separating said strips by locking or unlocking said fastening pieces, said slider having means to rotate said pieces about axes parallel to the line of junction of the strips to cause the strips to interlock by an intersection of their edges, said edges being stepped away from the main portion of the strips so as when locked to lie substantially flat; and runways for the slider along the strip behind the fastening pieces on the same side of said strips as the interlocked intersected edges.

10. In a sliding clasp fastening of the kind described comprising interpenetrating interlocking strips having projections along the edges thereof and a slider for joining together or separating said strips, said slider having means for interlocking said strips by successively entering a projection of one strip edgewise and obliquely between adjoining projections of the other strip while one of said adjoining projections is bent up and the other is bent down about axes parallel to the line of junction of the strips, said strips being separable by a reverse operation.

11. A slider for joining together or separating the fastening pieces of the strips of a sliding clasp fastening of the kind described, said slider comprising means to draw together or separate said strips and means to rotate said fastening pieces first to one side and then to the other of a neutral position about axes parallel to the line of junction of the strips for the purpose of effecting an engagement or disengagement of said strips.

12. A slider for joining together or separating the fastening pieces of the strips of a sliding clasp fastening of the kind described, said slider comprising means to draw together or separate said strips and cam means to rotate said fastening pieces first to one side and then to the other of a neutral position about axes parallel to the line of junction of the strips for the purpose of effecting an engagement or disengagement of said strips.

13. A slider for joining together or separating the fastening pieces of the strips of a sliding clasp fastening of the kind described, said slider comprising means to draw together or separate said strips and means to rotate said fastening pieces first in one direction and then in the opposite direction about axes parallel to the line of junction of the strips for the purpose of effecting an engagement or disengagement of said strips, said slider being comprised of separable members to provide for a complete separation of said strips.

14. A sliding clasp fastener comprising interlocking strips having spaced fastening projections and a slider for joining together or separating said strips by locking or unlocking said projections, said projections having head portions considerably wider than any part of the spaces between adjacent projections and being formed integrally with the strip of flexible material, said slider having means for causing such projections on each strip to project through and beyond such spaces in and to interlock in overlying relationship with the other strip.

15. A sliding clasp fastener comprising interlocking strips having spaced fastening projections and a slider for joining together or separating said strips by locking or unlocking said projections, said strips together with their projections being in the form of thin flexible material, and said slider having means for causing said projections on each strip to project through and beyond the spaces in the other strip and interlock in overlying relationship with the other strip, said strips being transversely stepped in such manner that when interlocked the projections lie substantially flat against said other strip.

16. A sliding clasp fastener comprising interlocking strips having spaced fastening projections and a slider for joining together or separating said strips by locking or unlocking said projections, said projections having head portions considerably wider than any part of the spaces between adjacent projections and being formed integrally with the strip of flexible material, said slider having means for causing such projections on each strip to project through and beyond such spaces in and interlock in overlying relationship with the other strip, said strips being so transversely stepped that when interlocked the projections lie substantially flat against said other strip.

17. A sliding clasp fastener comprising interlocking strips having spaced fastening projections and a slider for joining together or separating said strips by locking or unlocking said projections, said projections being of slight thickness and formed integrally with the strips of flexible material, and said slider having means for causing said projections on each strip to project through and beyond the spaces on the other strip and interlock in overlying relationship with the other strip, said strips having a longitudinal rib away from the fastening projections to form a runway for the slider.

18. A sliding clasp fastener comprising interlocking strips having spaced fastening projections and a slider for joining together or separating said strips by locking or unlocking said projections, said projections having head portions considerably wider than any part of the intervening spaces and being formed integrally with the strip of flexible material, said slider having means for causing such projections on each strip to project through and beyond such spaces in and to interlock in overlying relationship with the other strip, said strips having a longitudinal rib spaced from the fastening pieces to form a runway for the slider.

19. In connection with a sliding clasp fastener of the kind described, two flexible strips having along their longitudinal edges multiple spaced projections of slight thickness, said projections having head portions considerably wider than any part of the intervening spaces and being formed integrally with the strips of flexible material, said projections overlapping the flat surfaces of the strips when in interlocked relation and being bodily stepped away from the plane of the strips so that the strips are capable of lying in substantially the same plane; and a slider movable on said strips and having means for joining together or separating said strips by locking or unlocking said projections.

20. In connection with a sliding clasp fastener of the kind described, a flexible strip having along a longitudinal edge thereof multiple spaced projections of slight thickness, said projections having head portions considerably wider than any part of the intervening spaces and being formed integrally with the strip of flexible material, said strip having a longitudinal rib spaced from the fastening projections to form a runway for a slider.

21. A sliding clasp fastener of the kind described comprising interpenetrating interlocking strips having spaced fastening projections and a slider for joining together or separating said strips by locking or unlocking said projections, said spaced fastening projections being formed integrally with the strips of flexible material, said projections having heads considerably wider than the intervening spaces and said slider having means for causing such projections to be successively rotated about axes parallel to the line of junction of the strips to permit the projections of each strip to project through and beyond the intervening spaces of the other strip and interlock in overlying relationship with the other strip.

22. A sliding clasp fastening of the kind described comprising interlocking strips having spaced fastening pieces along the edges thereof and a slider for joining together or separating said strips, said pieces having head portions considerably wider than the intervening spaces and said slider having means for causing successively occurring rotations of said pieces out of the plane of the strips to enable the pieces on each strip to pass through and beyond such spaces in the other strip and interlock in overlying relationship with the other strip.

23. A sliding clasp fastener comprising flexible interpenetrating interlocking strips having spaced fastening projections and a slider for joining together or separating said strips by locking or unlocking said projections, said projections being of slight thickness with narrow neck portions and widened head portions and formed integrally with the strips of flexible material providing flexing hinges for said projections to permit said projections to be rotated out of the plane of the strips, and said slider having means successively so to rotate said pieces temporarily to expand the interspaces between said projections and allow the widened head portions to pass through and lie beyond said interspaces in overlying relationship with the companion strip.

24. A sliding clasp fastening of the kind described comprising flexible strips, a slider for joining together or separating said strips, said strips having fastening projections and spaces between said projections, said projections having their heads considerably wider than any part of the intervening spaces, said slider having means to rotate said projections about axes parallel to the line of junction of the strips to cause said projections to interpenetrate said spaces and interlock the said strips with each other and means by which a strip can be entirely separated from its companion strip.

25. A sliding clasp fastening of the kind described comprising interlocking strips of pliable material formed with spaced projections having narrow neck portions and widened head portions, the widened head portions of the projections on each strip projecting through and beyond the spaces in its opposed strip when said strips are in interlocked relation; and a slider having means to cause said projections to be successively rotated about axes parallel to the line of junction of the strips to permit said projections to enter obliquely within the spaces in the adjacent strip, the two strips being thereby locked together.

26. A sliding clasp fastening of the kind described comprising interlocking strips of pliable material formed with spaced projections having narrow neck portions and widened head portions, the widened head portions of the projections of each strip registering with the spaces in its opposed strip when said strips are in interlocked relation; and a slider having means to cause said projections to be successively rotated about axes parallel to the line of junction of the strips to permit said projections to enter obliquely within said spaces, the lateral edges of the projections on each strip engaging the lateral edges of the projections on its opposed strip, the strips being thereby interlocked.

27. A sliding clasp fastening of the kind described comprising opposed pliable strips each having substantially T-shaped elements spaced along the longitudinal edge thereof, said elements being separated by apertures formed in said strip; a slider fitted to said strips and having means to move said strips edgewise toward each other into overlapping relationship; and means provided by said slider successively to rotate said elements about axes parallel to the line of junction of said strips thereby to cause the T-shaped elements of each strip to be inserted obliquely within the apertures of the other strip, the head portion of each T-shaped element of each strip thereafter engaging the head portions of two elements of the opposed strip.

CHARLES JOHN CRAWFORD.